US012220937B2

(12) United States Patent
Takayama

(10) Patent No.: US 12,220,937 B2
(45) Date of Patent: Feb. 11, 2025

(54) WRITING BALL, METHOD FOR MANUFACTURING WRITING BALL, AND BALLPOINT PEN WITH WRITING BALL

(71) Applicant: KABUSHIKI KAISHA PILOT CORPORATION, Tokyo (JP)

(72) Inventor: Kouichi Takayama, Tokyo (JP)

(73) Assignee: KABUSHIKI KAISHA PILOT CORPORATION, Tokyo (JP)

(*) Notice: Subject to any disclaimer, the term of this patent is extended or adjusted under 35 U.S.C. 154(b) by 0 days.

(21) Appl. No.: 18/712,910

(22) PCT Filed: Nov. 17, 2022

(86) PCT No.: PCT/JP2022/042736

§ 371 (c)(1),
(2) Date: May 23, 2024

(87) PCT Pub. No.: WO2023/095713

PCT Pub. Date: Jun. 1, 2023

(65) Prior Publication Data

US 2024/0416673 A1 Dec. 19, 2024

(30) Foreign Application Priority Data

Nov. 26, 2021 (JP) ................................ 2021-192227

(51) Int. Cl.
*B43K 1/08* (2006.01)
*B43K 7/00* (2006.01)

(52) U.S. Cl.
CPC .............. *B43K 1/082* (2013.01); *B43K 1/084* (2013.01); *B43K 7/00* (2013.01)

(58) Field of Classification Search
CPC .......... B43K 1/082; B43K 1/084; B43K 7/00; B43K 1/08; B43M 11/085
(Continued)

(56) References Cited

U.S. PATENT DOCUMENTS 3,303,825 A 2/1967 Shuman et al.
3,746,456 A * 7/1973 Hill ........................ B43K 1/082 419/17

(Continued)

FOREIGN PATENT DOCUMENTS

DE 1270991 6/1968
JP 8-207481 8/1996

(Continued)

OTHER PUBLICATIONS

Written Opinion of the International Searching Authority issued Dec. 20, 2022 in International (PCT) Application No. PCT/JP2022/042736 (with English translation).

(Continued)

*Primary Examiner* — David J Walczak
(74) *Attorney, Agent, or Firm* — Wenderoth, Lind & Ponack, L.L.P.

(57) ABSTRACT

A writing ball capable of suppressing wear of a ball seat of a ballpoint pen tip and obtaining stable ink outflow, a writing ball that is a sphere, the sphere comprising, at least: a first hard component containing a first metal; a second hard component containing a second metal; and a binding component, the writing ball comprising: a first outer surface from which the first hard component is exposed, the first outer surface being an outermost surface of the sphere; and a recess including, as a bottom surface, a second outer surface from which the second hard component is exposed, the second outer surface being recessed inward from the first outer surface, wherein the first outer surface includes a smooth surface.

12 Claims, 4 Drawing Sheets

(58) Field of Classification Search
USPC .......................................... 401/208, 209, 215
See application file for complete search history.

(56) References Cited

U.S. PATENT DOCUMENTS

| | | | | |
|---|---|---|---|---|
| 6,332,728 | B1 * | 12/2001 | Ito .......................... | B43K 1/082 401/215 |
| 6,375,707 | B1 | 4/2002 | O'Donnell et al. | |
| 6,755,588 | B1 * | 6/2004 | Tsujikura ............... | B43K 1/082 401/209 |
| 2002/0026854 | A1 | 3/2002 | Nishikita et al. | |

FOREIGN PATENT DOCUMENTS

| | | |
|---|---|---|
| JP | 2000-62379 | 2/2000 |
| JP | 2001-80262 | 3/2001 |
| JP | 2001-246646 | 9/2001 |
| JP | 2002-280938 | 9/2002 |
| JP | 2005-254609 | 9/2005 |
| JP | 4473972 | 6/2010 |
| JP | 2020-90007 | 6/2020 |

OTHER PUBLICATIONS

English Translation of International Search Report issued Dec. 20, 2022 in International (PCT) Application No. PCT/JP2022/042736.
English Translation of International Preliminary Report on Patentability issued May 2, 2024 in International (PCT) Application No. PCT/JP2022/042736.
Extended Search Report issued Nov. 11, 2024 in corresponding European Patent Application No. 22898497.7.

* cited by examiner

WRITING BALL, METHOD FOR MANUFACTURING WRITING BALL, AND BALLPOINT PEN WITH WRITING BALL

TECHNICAL FIELD

The present invention relates to a writing ball attached to a ballpoint pen tip, a method for manufacturing the writing ball, and a ballpoint pen including the writing ball.

BACKGROUND ART

A writing ball rotatably mounted on a ball seat of a ballpoint pen tip supplies ink to a paper surface while rotating in contact with the paper surface to perform writing. Such a writing ball is desired to have a characteristic that the writing feel is less likely to deteriorate even when used for a long period of time. To meet this, there has been proposed a writing ball containing at least tungsten carbide and cobalt as a binding component, in which a proportion of nickel atoms to cobalt atoms in a range of a depth of 1 m from a ball surface is 0.01 wt % or more and 0.3 wt % or less (see, for example, Patent Document 1).

In the writing ball described in Patent Document 1, setting the proportion of nickel atoms to cobalt to 0.01 wt % or more and 0.3 wt % or less makes it possible to prevent elution of cobalt as a binding component and suppress falling of tungsten carbide generated from the elution. This can suppress an increase in the surface roughness of the writing ball, and thus a good writing feel can continue for a long time.

PRIOR ART DOCUMENT

Patent Document

Patent Document 1: JP-A-2005-254609

SUMMARY OF THE INVENTION

Problems to be Solved by the Invention

Usually, when the unevenness of the surface of the writing ball is increased, the ink is favorably applied, and the outflow of the ink is stabilized, but there is a problem that the wear of the ball seat of the ballpoint pen tip increases. On the other hand, when the unevenness of the ball surface is reduced, the wear of the ball seat is reduced, but the application of the ink becomes poor, and there is a problem that the outflow of the ink is not stable. Further, when the unevenness of the ball surface is small, burning may occur. In the writing ball described in Patent Document 1, it is possible to suppress an increase in surface roughness of the writing ball, but it is difficult to achieve both suppression of wear of the ball seat and stabilization of ink outflow.

Thus, an object of the present invention is to solve the above problems, and it is an object of the present invention to provide a writing ball capable of suppressing wear of a ball seat of a ballpoint pen tip and obtaining stable ink outflow, a method for manufacturing the writing ball, and a ballpoint pen including the writing ball.

Solutions to the Problems

A writing ball according to one aspect of the present invention is a writing ball that is a sphere, the sphere including, at least:

a first hard component containing a first metal;

a second hard component containing a second metal; and a binding component, the writing ball including:

a first outer surface from which the first hard component is exposed, the first outer surface being an outermost surface of the sphere; and a recess including, as a bottom surface, a second outer surface from which the second hard component is exposed, the second outer surface being recessed inward from the first outer surface, in which the first outer surface includes a smooth surface.

A method for manufacturing a writing ball according to one aspect of the present invention is a method for manufacturing a writing ball, the method including:

a sphere forming step of forming a sphere including at least a first hard component containing a first metal, a second hard component containing a second metal, and a binding component;

a surface treatment step of performing a surface treatment on the sphere that has been formed; and an etching step of etching the sphere subjected to the surface treatment using a solution that dissolves the second hard component but does not dissolve the first hard component.

A ballpoint pen according to one aspect of the present invention includes a ballpoint pen tip to which the writing ball described above is rotatably mounted in such a manner as to be in contact with a ball seat.

Effects of the Invention

In this manner, the present invention can provide a writing ball capable of suppressing wear of a ball seat of a ballpoint pen tip and obtaining stable ink outflow, a method for manufacturing the writing ball, and a ballpoint pen including the writing ball.

DETAILED DESCRIPTION

Next, specific embodiments of the present invention will be described in detail with reference to the drawings.

Figure 1A:
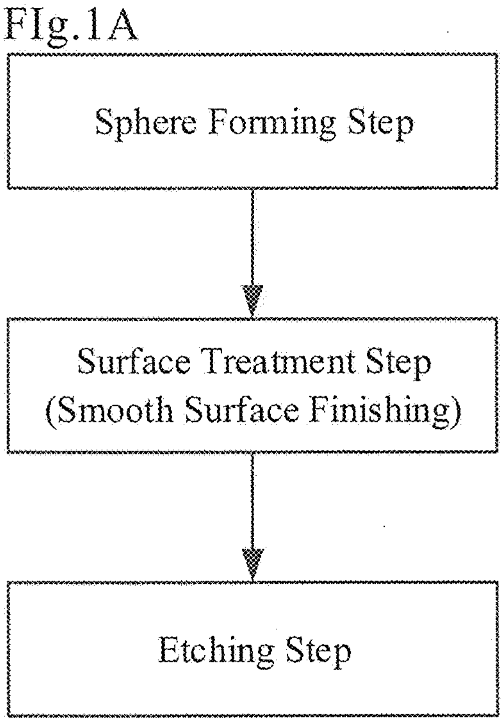
FIG. 1A is a flowchart showing a flow of a method for manufacturing a writing ball according to an embodiment of the present invention, which is a diagram showing a case where only a smooth surface finishing is performed as a surface treatment step.
Figure 1B:
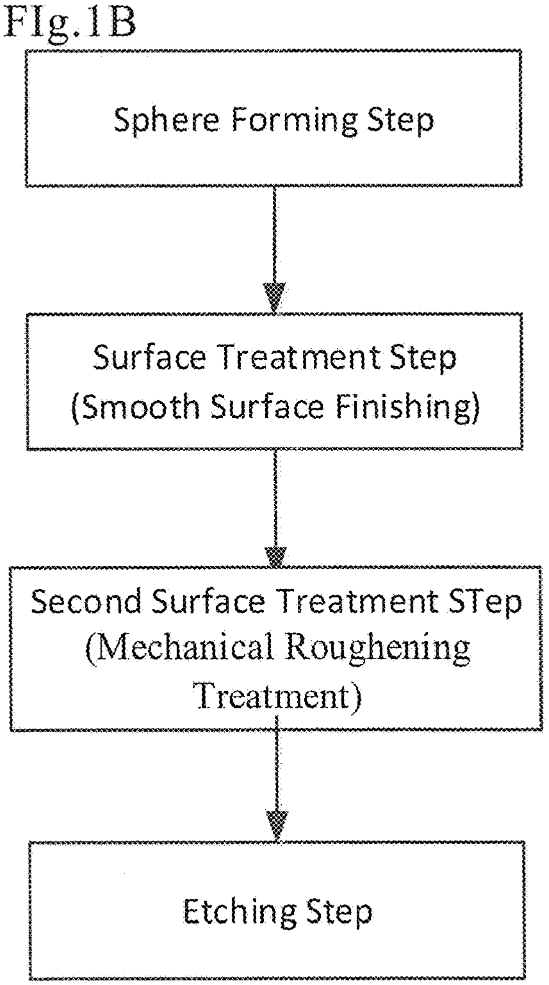
FIG. 1B is a flowchart showing a flow of the method for manufacturing a writing ball according to the embodiment of the present invention, which is a diagram showing a case where a first surface treatment step that is a smooth surface finishing is performed and then a second surface treatment step that is a mechanical roughening treatment is performed as the surface treatment step.

Description of Method for Manufacturing Writing Ball According to Embodiment of Present Invention First, a method for manufacturing a writing ball according to an embodiment of the present invention will be described with reference to FIGS. 1A and 1B. FIGS. 1A and 1B are flowcharts showing flows of the method for manufacturing a writing ball according to the embodiment of the present invention. FIG. 1A shows a case where only a smooth surface finishing is performed as a surface treatment step, and FIG. 1B shows a case where a first surface treatment step that is a smooth surface finishing is performed and then a second surface treatment step that is a mechanical roughening treatment is performed as the surface treatment step. FIGS. 1A and 1B are the same for the other steps except for the surface treatment step.

<Sphere Forming Step>

First, a sphere forming step of forming a sphere to be a base of the writing ball is performed. The sphere includes at least a first hard component containing a first metal, a second hard component containing a second metal, and a binding component. Titanium (Ti) can be exemplified as the first metal, and titanium carbide (TiC) can be exemplified as the first hard component. Tungsten (W) can be exemplified as the second metal, and tungsten carbide (WC) can be exemplified as the second hard component. Nickel (Ni) can be exemplified as the binding component. Further, it is preferable to contain chromium (Cr) to improve corrosion resistance.

Mixing and sintering powders of the metal components described above makes it possible to form a cemented carbide sphere to be a base material of the writing ball. The sphere can be formed by mixing predetermined amounts of TiC powder, WC powder, Ni powder, and Cr powder, and using a pressure free sintering method such as a thermal plasma sintering method, a microwave sintering method, or a millimeter wave sintering method, or a pressure sintering method such as a hot press sintering method, a discharge plasma sintering method, an ultrahigh voltage sintering method, a hot isostatic pressure sintering method, or a high pressure gas reaction sintering method.

Examples of the amount of powder to be added include about 8 to 15 WT % of TiC powder, about 80 to 88 WT % of WC powder, about 2 to 5 WT % of Ni powder, and about 2 WT % of Cr powder. When the weight of the tungsten carbide (WC) component is around 10 times the weight of the titanium carbide (TiC) component like this, the volumes of the tungsten carbide (WC) component and the titanium carbide (TiC) component have approximate values. Sintering a mixture of these powders makes it possible to obtain a WC—TiC—Cr—Ni-based cemented carbide sphere.

<Surface Treatment Step>

Next, a surface treatment step of performing a surface treatment on the sphere formed in the sphere forming step is performed. In the surface treatment step, there are cases where only a smooth surface finishing is performed as shown in FIG. 1A and where a first surface treatment step that is a smooth surface finishing is performed and then a second surface treatment step that is a mechanical roughening treatment is performed as shown in FIG. 1B.

[Smooth Surface Finishing]

In the surface treatment step, the sphere can be finished to have a smooth surface by, for example, a polishing treatment using a diamond powder having a relatively small particle size. However, the present invention is not limited to this treatment, and the smooth surface finishing can be performed by any other known method. Such a smooth surface finishing can reliably smooth the outermost surface of the sphere. The writing ball formed of the sphere can effectively suppress wear of a ball seat because of the smooth surface.

[Mechanical Roughening Treatment]

In the second surface treatment step performed after the first surface treatment step that is a smooth surface finishing, a mechanical roughening treatment can be performed on the sphere by, for example, a polishing treatment using a diamond powder having a particle size larger than that of the diamond powder used in the smooth surface finishing. However, the present invention is not limited to this treatment, and mechanical roughening treatment can be performed by any other known method. Such a mechanical roughening treatment makes it possible to form a rough surface portion on the outermost surface of the sphere. The writing ball formed of the sphere, with which the friction between the writing ball and a paper surface is increased while the burning of the ball seat is suppressed because of the rough surface portion, can rotate easily and can improve the writing performance.

The mechanical roughening treatment is not performed until the entire smooth surface is roughened. With the treatment, the ball has a surface in which a region having a smooth surface and a region having a rough surface are mixed such that an infinite number of scratch-shaped recesses run on the surface.

<Etching Step>

Next, an etching step of performing an etching treatment on the sphere subjected to the surface treatment as described above is performed. For the etching, a solution that dissolves the second hard component but does not dissolve the first hard component is used. For example, when the first hard component is titanium carbide (TiC), and the second hard component is tungsten carbide (WC), etching of dissolving only tungsten carbide (WC) without dissolving titanium carbide (TiC) can be performed by using an alkali solution.

Examples of the alkali solution used for etching include alkali solutions such as Murakami's reagent. The writing ball according to the embodiment of the present invention is formed through the etching step.

The rough surface formed on the surface of titanium carbide (TiC) is maintained as it is, and the rough surface formed on the surface of tungsten carbide (WC) becomes a deeper rough surface through the etching step.

In this manner, through the etching step using the solution that dissolves the second hard component but does not dissolve the first hard component, the second hard component is dissolved while the outermost surface of the sphere where the first hard component is exposed is maintained, and a recess that is recessed from the outermost surface can be formed. The outermost surface where the first hard component is exposed can suppress wear and burning of the ball seat of the ballpoint pen tip to which the writing ball is attached. In addition, since the ink can be held in the recess, the outflow of the ink can be stabilized, which also contributes to lubrication of the ball seat. Thus, it is possible to reliably manufacture a writing ball having good writing performance and contributing to an increase in the life of the ball seat.

In the above description, the etching step is performed after the surface treatment step, but the present invention is not limited to this order. The surface treatment step can be performed after the etching step in reverse.

Writing Ball According to First Embodiment of Present Invention

Figure 2:
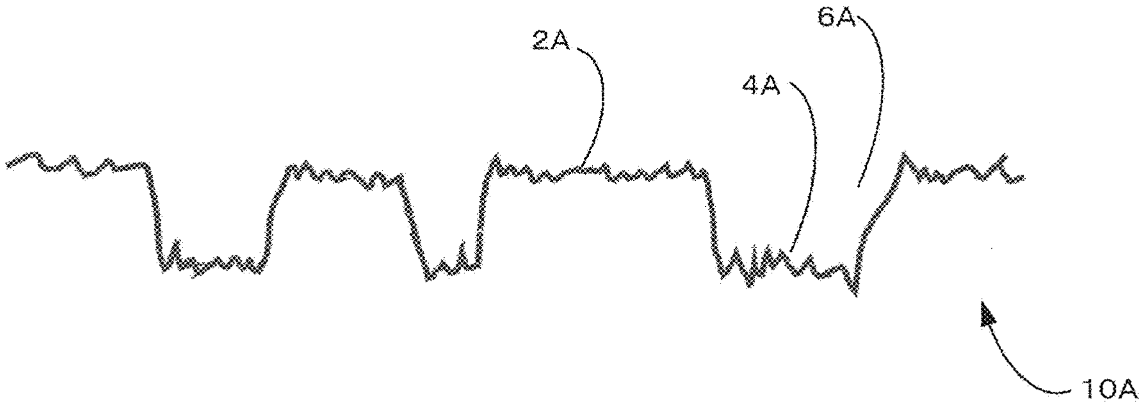
FIG. 2 is a diagram showing a state of unevenness of a surface of a writing ball according to a first embodiment of the present invention.
Figure 3:
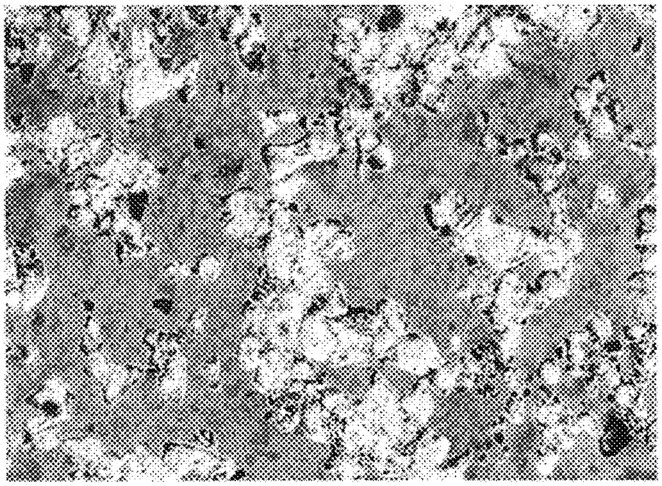
FIG. 3 is a micrograph (SEM) showing a surface of an example corresponding to the first embodiment.

Next, a writing ball according to a first embodiment manufactured by the above manufacturing method will be described with reference to FIGS. 2 and 3. FIG. 2 is a diagram showing a state of unevenness of a surface of the writing ball according to the first embodiment of the present invention. FIG. 2 is a diagram drawn based on a micrograph of a section of the writing ball, in which unevenness is emphasized. FIG. 3 is a micrograph (SEM/10,000 magnifications) showing a surface of an example corresponding to the first embodiment. A writing ball 10A according to the first embodiment corresponds to the manufacturing method shown in FIG. 1A, and is a writing ball manufactured by performing only the smooth surface finishing in the surface treatment step.

As illustrated in FIG. 2, the writing ball 10A according to the first embodiment includes a first outer surface 2A, which is an outermost surface of the sphere from which the first hard component is exposed, and a recess 6A having, as a bottom surface, a second outer surface 4A from which the second hard component is exposed, the second outer surface 4A being recessed inward from the first outer surface 2A.

In FIG. 2, the first outer surface 2A of the smoothed outermost surface has a surface roughness of less than 10 nm, preferably less than 5 nm, at an arithmetic mean height Sa (ISO 25178). In addition, through the etching step, the recess 6A recessed inward in a range of 5 nm or more and 0.5 μm or less is formed at a maximum height Sz (measured by NewView manufactured by Zygo Corporation based on ISO 25178). The width dimension of the recess 6A can be about 0.1 to 10 μm, for example. The second outer surface 4A constituting the bottom surface of the recess 6A is recessed inward from the first outer surface 2A within a range of 5 nm or more and 0.5 μm or less.

In the micrograph of FIG. 3, a portion indicated by a dark color indicates the first outer surface 2A that is the outermost surface, and a portion indicated by white indicates the second outer surface 4A that is recessed inward. As described above, in the writing ball 10A according to the present embodiment, since the volumes of the titanium carbide (TiC) component and the tungsten carbide component (WC) have approximate values, the first outer surface 2A where titanium carbide (TiC) as the first hard component is exposed and the second outer surface 4A where tungsten (WC) as the second hard component is exposed are substantially evenly distributed. When the sphere as the base material of the writing ball 10A is formed by sintering, TiC powder, WC powder, Ni powder as a binding component, and the like are uniformly mixed, and thus the recesses 6A having the second outer surface 4A as the bottom surface are uniformly scattered in the entire area of the outermost surface formed of the first outer surface 2A.

As is clear from FIGS. 2 and 3, the outermost first outer surface 2A surrounded by the recess 6A having the second outer surface 4B as a bottom surface has a width dimension in microns, and a sufficiently large smooth surface comes into contact with the ball seat. This makes it possible to sufficiently suppress wear and burning of the ball seat. At the same time, the recess 6A having the second outer surface 4B as the bottom surface has a width dimension and a depth in microns, and a sufficient amount of ink can be held in the recess 6A.

Figure 6:
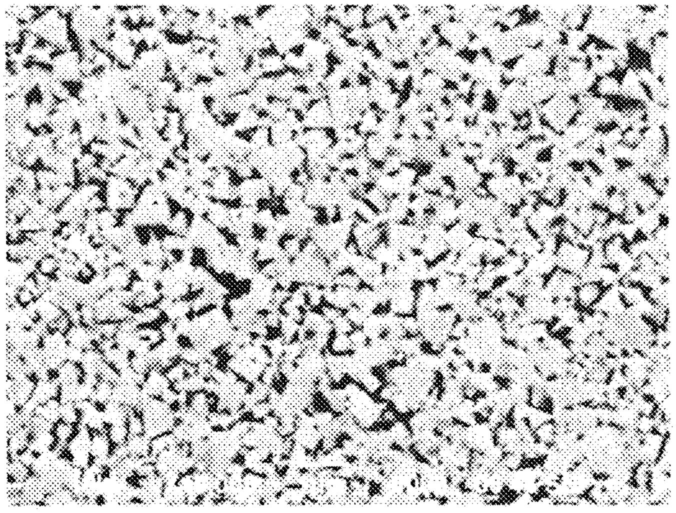
FIG. 6 is a micrograph (SEM) showing a surface of a comparative example.

Here, as a comparative example, a micrograph (SEM/10,000 magnifications) of a surface of a conventional WC—Co—Cr-based writing ball is shown in FIG. 6. In the WC—Co—Cr-based writing ball, an etching treatment only forms uniform unevenness on the whole. Thus, various etching treatments and surface treatments only change the size of the uniformly generated unevenness. For this reason, when the unevenness of the surface of the writing ball is increased, a problem of having an increased amount of wear of the ball seat occurs, and when the unevenness is decreased, a problem of having poor ink application occurs.

As described above, the writing ball 10A according to the first embodiment of the present invention is a sphere including at least the first hard component (TiC) containing the first metal (Ti), the second hard component (WC) containing the second metal (W), and the binding component (Ni), and the sphere includes the first outer surface 2A that is an outermost surface of the sphere from which the first hard component is exposed, and the recess 6A having, as a bottom surface, the second outer surface 4A from which the second hard component is exposed, the second outer surface 4A being recessed inward from the first outer surface 2A.

The outermost first outer surface 2A can suppress wear and burning of the ball seat of the ballpoint pen tip to which the writing ball 10A is attached. In addition, since the ink can be held in the recess 6A having the second outer surface 4A as a bottom surface, the outflow of the ink can be stabilized, which also contributes to lubrication of the ball seat. Thus, it is possible to provide the writing ball 10A capable of suppressing wear of the ball seat and obtaining stable ink outflow.

In particular, when the first outer surface 2A is a smooth surface, wear and burning of the ball seat can be more effectively suppressed.

When the first hard component is titanium carbide (TiC) and the second hard component is tungsten carbide (WC), the first outer surface 2A as the outermost surface and the second outer surface 4A recessed inward from the outermost surface can be reliably formed by, for example, etching with an alkali solution.

Further, since at least nickel (ni) is contained as the binding component, the writing ball 10A having high strength in which the first hard component (TiC) and the second hard component (WC) are firmly bound is obtained.

However, the binding component is not limited to the above, and examples thereof include cobalt (Co).

Writing Ball According to Second Embodiment of Present Invention

Figure 4:
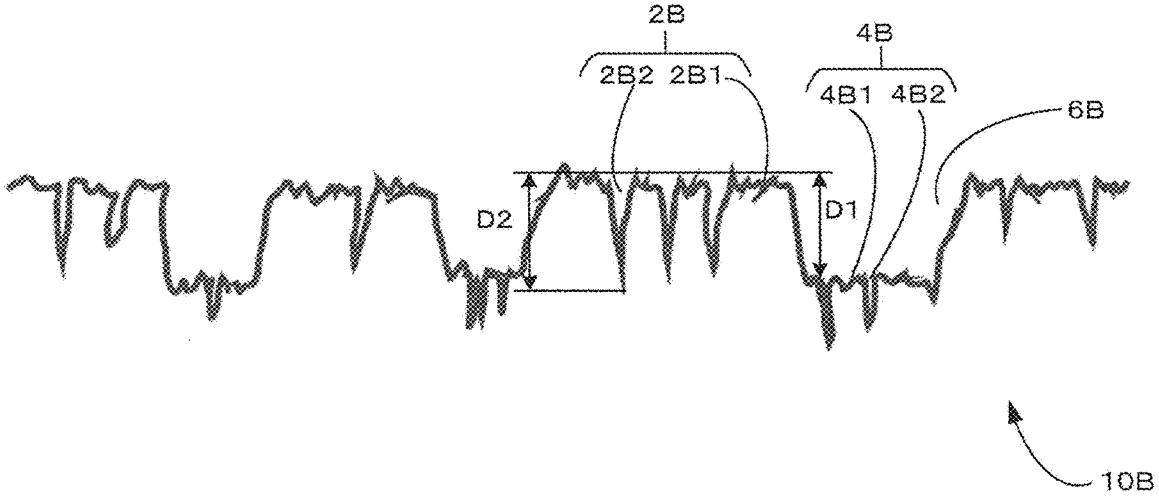
FIG. 4 is a diagram showing a state of unevenness of a surface of a writing ball according to a second embodiment of the present invention.
Figure 5:
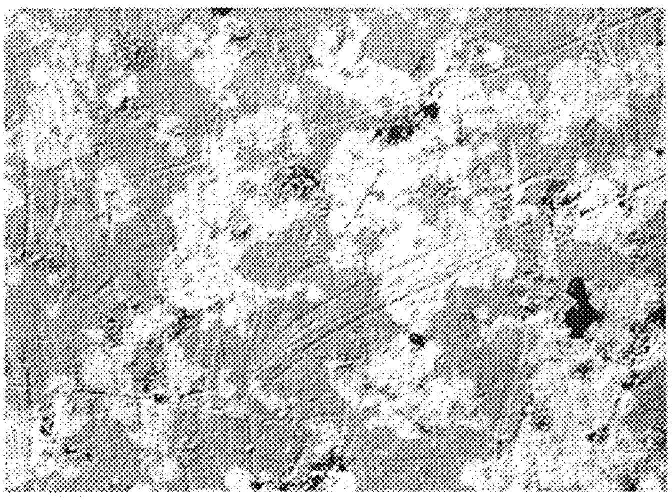
FIG. 5 is a micrograph (SEM) showing a surface of an example corresponding to the second embodiment.

Next, a writing ball according to a second embodiment manufactured by the above manufacturing method will be described with reference to FIGS. 4 and 5. FIG. 4 is a diagram showing a state of unevenness of a surface of the writing ball according to the second embodiment of the present invention. FIG. 4 is a diagram drawn based on a micrograph of a section of the writing ball, in which unevenness is emphasized. FIG. 5 is a micrograph (SEM/10,000 magnifications) showing a surface of an example corresponding to the second embodiment. A writing ball 10B according to the second embodiment corresponds to the manufacturing method shown in FIG. 1B, and is a writing ball manufactured by performing a first surface treatment step that is a smooth surface finishing and then performing a second surface treatment step that is a mechanical roughening treatment in the surface treatment step.

As illustrated in FIG. 4, the writing ball 10B according to the second embodiment also includes a first outer surface 2B, which is an outermost surface of a sphere from which the first hard component (TiC) is exposed, and a recess 6B having, as a bottom surface, a second outer surface 4B from which the second hard component (WC) is exposed, the second outer surface 4B being recessed inward from the first outer surface 2B.

In FIG. 4, a smooth surface 2B1 and a rough surface (hereinafter, referred to as a "first rough surface portion") 2B2 are mixed on the outermost first outer surface 2B subjected to the first and second surface treatment steps. More specifically, the first outer surface 2B has a surface property in which an infinite number of scratch-shaped recesses (first rough surface portions) 2B2 run on the surface of the smooth surface 2B1. The smooth surface 2B1 has a surface roughness of less than 10 nm, preferably less than 5 nm, at an arithmetic mean height Sa (ISO 25178). The first rough surface portion 2B2 has a surface roughness in a range of 10 nm or more and 5 μm or less at a maximum height Sz (measured by NewView manufactured by Zygo Corporation based on ISO 25178).

Further, through the etching step, the recess 6B recessed inward in a range of 5 nm or more and 0.5 m or less is formed at a maximum height Sz (measured by NewView manufactured by Zygo Corporation based on ISO 25178). The width dimension of each recess 6B can be about 0.1 to 10 μm, for example.

The second outer surface 4B constituting the bottom surface of the recess 6B has a non-uneven surface 4B1 in which the smooth surface formed in the first and second surface treatment steps is recessed through the etching step, and a rough surface (hereinafter referred to as "second rough surface portion") 4B2 in which the recess of the rough surface formed in the first and second surface treatment steps is recessed more deeply through the etching step.

As shown in FIG. 4, when the recess amount of the first outer surface 2B of the non-uneven surface 4B1 with respect to the smooth surface 2B1 is D1, D1 is 5 nm or more and 0.5 μm or less. On the other hand, when the recess amount of the first outer surface 2B of the first rough surface portion 2B2 with respect to the smooth surface 2B1 is D2, D2 is 10 nm or more and 5 μm or less.

Thus, a relationship of D1<D2 is satisfied.

As a result, since a rough surface always remains on the bottom surface of the recess 6B after the etching treatment, the amount of ink held on the second outer surface 4B can be increased. Further, since the second rough surface portion 4B2 having a deeper recess is formed through dissolution with the etching solution, a larger amount of ink can be held on the second outer surface 4B.

In the micrograph of FIG. 5, a portion indicated by a dark color indicates the first outer surface 2B that is the outermost surface, and a portion indicated by white indicates the second outer surface 4B recessed inward. The recesses 6B having the second outer surface 4B as a bottom surface are uniformly scattered in the entire area of the outermost surface as the first outer surface 2B in the same manner as in the above.

As is clear from FIGS. 4 and 5, the outermost first outer surface 2B surrounded by the recess 6B having the second outer surface 4B as a bottom surface has a width dimension in microns. Thus, the first outer surface 2B, which is a rough surface, increases friction with a paper surface while suppressing wear and burning of the ball seat, and thus the ball easily rotates, and writing performance can be improved. At the same time, the recess 6B having the second outer surface 4B as a bottom surface has a width dimension and a depth in microns, and a sufficient amount of ink can be held in the recess 6B.

As described above, the writing ball 10B according to the second embodiment is also a sphere including at least the first hard component (TiC) containing the first metal (Ti), the second hard component (WC) containing the second metal (W), and the binding component (Ni), and the sphere includes the first outer surface 2B that is an outermost surface of the sphere from which the first hard component is exposed, and the recess 6B having, as a bottom surface, the second outer surface 4B from which the second hard component is exposed, the second outer surface being recessed inward from the first outer surface 2B.

Also in the second embodiment, as in the first embodiment described above, wear of the ball seat of the ballpoint pen tip on which the writing ball 10B is mounted can be suppressed because of the first outer surface 2B, which is the outermost surface. In addition, since the ink can be held in the recess because of the second outer surface 4B, the outflow of the ink can be stabilized, which also contributes to lubrication of the ball seat, and burning can be suppressed. Thus, it is possible to provide the writing ball 10B capable of suppressing wear of the ball seat and obtaining stable ink outflow.

In particular, when the first outer surface 2B also has the first rough surface portion 2B2, friction with a paper surface increases while wear and burning of the ball seat are suppressed, and thus the ball easily rotates and writing performance can be improved.

(Distribution State of Recesses)

In the above embodiments, the volumes of the titanium carbide (TiC) component and the tungsten carbide (WC) component of the writing balls 10A and 10B have approximate values, and the outermost surfaces formed of the first outer surfaces 2A and 2B and the recesses 6A and 6B having the second outer surfaces 4A and 4B as bottom surfaces are present in a substantially the same manner. However, it is also conceivable to change the distribution state between the outermost surfaces formed of the first outer surfaces 2A and 2B and the recesses 6A and 6B having the second outer surfaces 4A and 4B as bottom surfaces depending on the properties and application of the ink. Hereinafter, an example of changing the distribution state of the recesses 6A and 6B will be described.

<Adjustment of Particle Size>

In the writing balls 10A and 10B according to the above embodiments, the distribution state of the recesses 6A and 6B formed in the etching step can be adjusted by adjusting the particle sizes of titanium carbide (TiC) as the first hard component and tungsten carbide (WC) as the second hard component. Basically, when the particle size of titanium carbide (TiC) as the first hard component is increased, the proportion of the outermost surface formed of the first outer surfaces 2A and 2B can be increased, and when the particle size of tungsten carbide (WC) as the second hard component is increased, the proportion of the recesses 6A and 6B having the second outer surfaces 4A and 4B as bottom surfaces can be increased.

From the viewpoint of achieving both suppression of wear of the ball seat and stabilization of ink outflow, it is preferable to adjust the particle size of titanium carbide (TiC) as the first hard component and the particle size of tungsten carbide (WC) as the second hard component to set the volume ratio of the titanium carbide (TiC) component and the tungsten carbide (WC) component within the range of 3:7 to 7:3. As a result, a balanced distribution state of the recesses 6A and 6B is obtained. In particular, varying the particle size of tungsten carbide (WC) as the second hard component makes it possible to effectively change the distribution state of the recesses and provide a writing ball suitable for the application.

First to Third Examples

Figure 7A:
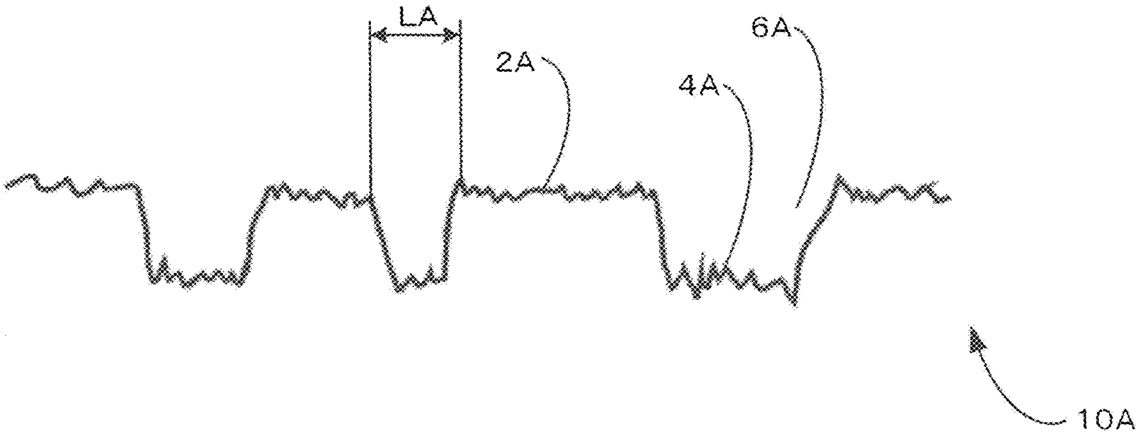
FIG. 7A is a diagram showing a state of unevenness of a surface of a writing ball of a first example.
Figure 7B:
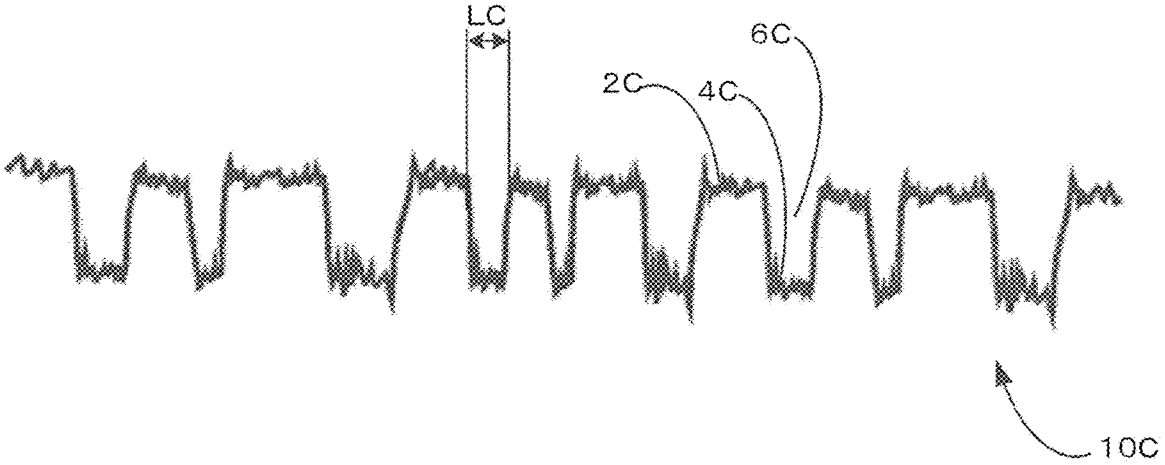
FIG. 7B is a diagram showing a state of unevenness of a surface of a writing ball of a second example.
Figure 7C:
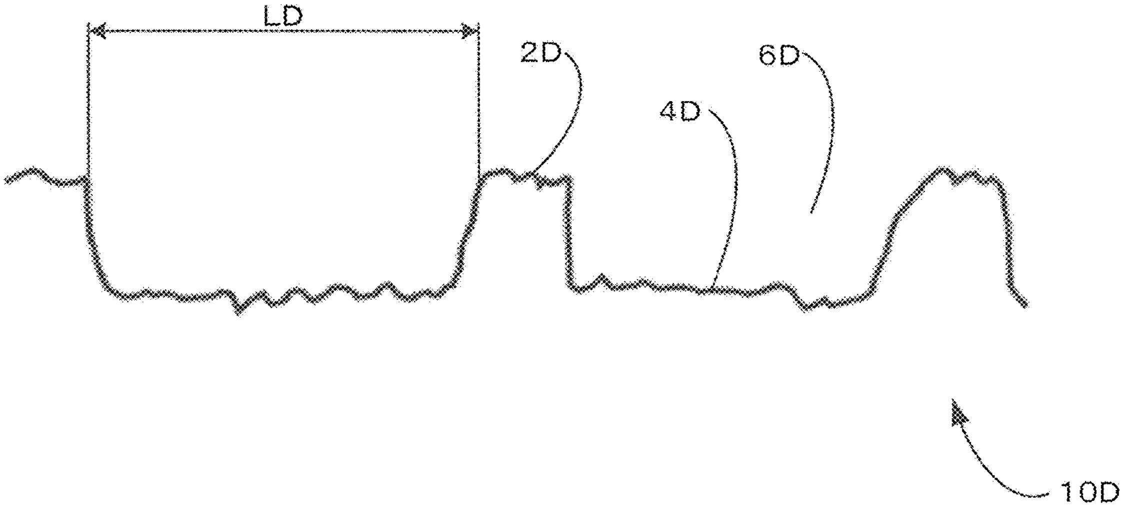
FIG. 7C is a diagram showing a state of unevenness of a surface of a writing ball of a third example.

Next, the writing balls of first to third examples experimentally produced by actually varying the particle size of tungsten carbide (WC) as the second hard component will be described. Here, FIG. 7A is a diagram showing the state of the unevenness of the surface of the writing ball of the first example, FIG. 7B is a diagram showing the state of the unevenness of the surface of the writing ball of the second example, and FIG. 7C is a diagram showing the state of the unevenness of the surface of the writing ball of the third example.

Each of the writing balls 10A, 10C, and 10D of the first, second, and third examples was experimentally produced by the method for manufacturing a writing ball shown in FIG. 1A. Specifically, first, the sphere forming step of mixing and sintering powder of titanium carbide (TiC) as a first hard component, powder of tungsten carbide (WC) as a second hard component, and Ni powder and Cr powder as binding components to form a cemented carbide sphere to be a base material of the writing ball was performed.

At this time, the same powder is used for titanium carbide (TiC) as the first hard component in the first to third examples. On the other hand, for tungsten carbide (WC) as the second hard component, powders having different particle sizes were used in the first to third examples.

In the first example, a powder of tungsten carbide (WC) having a particle size dA of 1 to 2 μm was used. In the second example, a powder of tungsten carbide (WC) having a particle size dC of 0.5 to 1μ, which is smaller (about half) than that of the first example, was used. In the third example, a powder having a particle size of 2 to 4 μm, which is larger (about 2 times) than that that of the first example, was used. The same powder was used for Ni powder and Cr powder as the binding components in the first to third examples.

Next, a surface treatment step of performing a smooth surface finishing treatment on the surface of the sphere formed in the sphere forming step was performed.

Then, an etching step of etching the sphere subjected to the surface treatment with an alkali solution was performed. Through this etching step, tungsten carbide (WC) as the second hard component was dissolved while the outermost surface of the sphere where titanium carbide (TiC) as the first hard component was exposed was maintained, and a recess recessed from the outermost surface was formed.

As shown in FIG. 7A, the writing ball 10A of the first example including the first outer surface 2A, which is an outermost surface of the sphere from which the first hard component is exposed, and the recess 6A having, as a bottom surface, the second outer surface 4A from which the second hard component is exposed, the second outer surface 4A being recessed inward from the first outer surface 2A, was thus obtained. The writing ball 10A of the first example shown in FIG. 7A is substantially the same as the writing ball 10A according to the first embodiment shown in FIG. 2.

Also, as shown in FIG. 7B, the writing ball 10C of the second example including the first outer surface 2C, which is an outermost surface of the sphere from which the first hard component is exposed, and the recess 6C having, as a bottom surface, the second outer surface 4C from which the second hard component is exposed, the second outer surface 4C being recessed inward from the first outer surface 2C, was obtained. Further, as shown in FIG. 7C, the writing ball 10D of the third example including the first outer surface 2D, which is an outermost surface of the sphere from which the first hard component is exposed, and the recess 6D having, as a bottom surface, the second outer surface 4D from which the second hard component is exposed, the second outer surface 4D being recessed inward from the first outer surface 2D, was obtained.

In the sphere forming step, powder of titanium carbide (TiC), powder of tungsten carbide (WC), and Ni powder and Cr powder as binding components are mixed so as to be uniform and then sintered, and thus, basically, particles of titanium carbide (TiC) and particles of Ni and Cr are present between adjacent particles of tungsten carbide (WC). Thus, it is considered that the recesses 6A, 6C, and 6D formed by dissolving the tungsten carbide (WC) particles with the etching solution have width dimensions LA, LC, and LD corresponding to the particle sizes dA, dC, and dD of the tungsten carbide (WC) particles, respectively.

Since the particle size dC of the particles of tungsten carbide (WC) of the second example is about half the particle size dA of the particles of tungsten carbide (WC) of the first example, the width dimension LC of the recess 6C of the second example is about half the width dimension LA of the recess 6A of the first example. Since the particle size dD of the particles of tungsten carbide (WC) of the third example is about twice the particle size dA of the particles of tungsten carbide (WC) of the first example, the width dimension LD of the recess 6D of the third example is about twice the width dimension LA of the recess 6A of the first example.

In the first example, as described above, wear and burning of the ball seat of the ballpoint pen tip on which the writing ball 10A is mounted can be effectively suppressed because of the first outer surface 2A that is the outermost smooth surface. In addition, since the ink can be held in the recess 6A having the second outer surface 4A as a bottom surface, the outflow of the ink can be stabilized, which also contributes to lubrication of the ball seat.

In the second example, since a finer uneven shape is obtained as compared with the first example, the smooth surface that is the first outer surface 2C continues more finely. As a result, it is possible to provide the writing ball 10C capable of stably sliding with respect random movements.

In the third example, since a coarser uneven shape is obtained as compared with the first example, the interval between smooth surfaces that are the first outer surface 2D is increased. This exerts the spike effect, and the writing ball 10D bites at a paper surface, and as a result, it is possible to provide the writing ball 10D having improved writing performance.

Since the recesses 6A, 6C, and 6D have the width dimensions LA, LC, and LD corresponding to the particle sizes dA, dC, and dD of the particles constituting the second hard component (tungsten carbide (WC)) like this, it is possible to provide the writing balls 10A, 10C, and 10D having performance suitable for the application.

As described above, the writing balls 10A, 10C, and 10D of the first to third examples were experimentally produced by performing the sphere forming step of forming a sphere including at least the first hard component (titanium carbide (TiC)) containing the first metal, the second hard component (tungsten carbide (WC)) containing the second metal, and the binding component (Ni, Cr), the surface treatment step of performing the surface treatment on the formed sphere, and the etching step of etching the surface-treated sphere using the solution that dissolves the second hard component but does not dissolve the first hard component.

At this time, the manufactured writing balls 10A, 10C, and 10D have the first outer surfaces 2A, 2C, and 2D that are the outermost surfaces of the sphere from which the first hard component (titanium carbide (TiC)) is exposed, and the recesses 6A, 6C, and 6D that have the second outer surfaces 4A, 4C, and 4D recessed inward from the first outer surfaces 2A, 2C, and 2D from which the second hard component (tungsten carbide (WC)) is exposed, as bottom surfaces, and the width dimensions LA, LC, and LD of the recesses 6A, 6C, and 6D of the manufactured writing balls 10A, 10C, and 10D can be varied by varying the particle sizes dA, dC, and dD of the particles constituting the second hard component (tungsten carbide (WC)) used in the sphere forming step.

Varying the particle sizes dA, dC, and dD of the particles constituting the second hard component (tungsten carbide (WC)) makes it possible to reliably manufacture the writing balls 10A, 10C, and 10D having the recesses 6A, 6C, and 6D of the width dimensions LA, LC, and LD that cause the performance suitable for the application to be exhibited.

The particle sizes of the particles constituting the first hard component and the particles constituting the second hard component are not limited to the above numerical values, and particles having any other particle sizes can be used. Further, in the above description, only the smooth surface finishing treatment is performed as the surface treatment step, but the same function effect can be obtained even when the mechanical roughening treatment is further performed.

Adjusting the particle sizes of the first hard component (TiC) and the second hard component (WC) in this manner makes it possible to reliably adjust the distribution state of the region where the outermost surfaces 2A and 2B of the writing balls 10A and 10B are maintained and the recesses 6A and 6B. As a result, the writing balls 10A and 10B having desired characteristics can be reliably manufactured.

<Adjustment of Proportion of First Hard Component and Second Hard Component>

When the weight of the tungsten carbide (WC) component is around 10 times the weight of the titanium carbide (TiC) component as described above, the volumes of the tungsten carbide (WC) component and the titanium carbide (TiC) component have approximate values. As a result, the recesses 6A and 6B having the second outer surfaces 4A and 4B as bottom surfaces are distributed in a state as shown in FIGS. 3 and 5.

Here, the distribution state of the recesses 6A and 6B formed in the etching step can be adjusted by adjusting the weight ratio of titanium carbide (TiC) as the first hard component and tungsten carbide (WC) as the second hard component. Basically, when the weight ratio of titanium carbide (TiC) as the first hard component is increased, the proportion of the outermost surface formed of the first outer surfaces 2A and 2B can be increased, and when the weight of tungsten carbide (WC) as the second hard component is increased, the proportion of the recesses 6A and 6B formed of the second outer surfaces 4A and 4B can be increased.

From the viewpoint of achieving both suppression of wear of the ball seat and stabilization of ink outflow, it is preferable that the weight of tungsten carbide (WC) as the second hard component is kept within the range of 7 to 13 times the weight of titanium carbide (TiC) as the first hard component. Keeping the weight within this range causes the volume ratio of the titanium carbide (TiC) component and the tungsten carbide (WC) component to fall within the range of 3:7 to 7:3, which makes it possible to obtain a balanced distribution state of the recesses 6A and 6B.

Adjusting the weight ratio of the first hard component (TiC) and the second hard component (WC) like this also makes it possible to reliably adjust the distribution state of the region where the outermost surfaces 2A and 2B of the writing balls 10A and 10B are maintained and the recesses 6A and 6B. As a result, the writing balls 10A and 10B having desired characteristics can be reliably manufactured.

Ballpoint Pen Including Writing Ball According to Present Embodiment

The writing balls 10A and 10B according to the embodiments described above are rotatably mounted so as to be in contact with the ball seat of the ballpoint pen tip and used. Providing such a ballpoint pen tip to which the writing balls 10A and 10B are attached makes it possible to provide a highly reliable ballpoint pen having good writing performance and less wear and burning of the ball seat.

The writing balls 10A and 10B according to the present embodiments can be applied to ballpoint pen tips of ballpoint pens using various inks including aqueous ink and gel ink as well as oil-based ink.

Although the embodiments of the present invention have been described, the disclosure content may change in details of the configuration, and combinations of elements, changes in order, and the like in the embodiments can be realized without departing from the scope and spirit of the claimed present invention.

EXPLANATION OF REFERENCES

2A, 2B, 2C, 2D first outer surface
2B1 smooth surface
2B2 first rough surface portion
4A, 4B, 4C, 4D second outer surface
4B1 non-uneven surface
4B2 second rough surface portion
6A, 6B, 6C, 6D recess
10A, 10B, 10C, 10D writing ball

The invention claimed is:

1. A writing ball that is a sphere, the sphere comprising, at least:
a first hard component containing a first metal;
a second hard component containing a second metal; and
a binding component,
the writing ball comprising:
a first outer surface from which the first hard component is exposed, the first outer surface being an outermost surface of the sphere; and
a recess including, as a bottom surface, a second outer surface from which the second hard component is exposed, the second outer surface being recessed inward from the first outer surface,
wherein the first outer surface includes a smooth surface.

2. The writing ball according to claim 1, wherein the recess has a width dimension corresponding to a particle size of particles constituting the second hard component.

3. The writing ball according to claim 1, wherein the first outer surface includes a first rough surface portion.

4. The writing ball according to claim 3, wherein the second outer surface includes a second rough surface portion.

5. The writing ball according to claim 1, wherein the first hard component is titanium carbide (TiC), and the second hard component is tungsten carbide (WC).

6. The writing ball according to claim 5, the writing ball comprising at least nickel as the binding component.

7. A ballpoint pen comprising a ballpoint pen tip to which the writing ball according to claim 1 is rotatably mounted in such a manner as to be in contact with a ball seat.

8. A method for manufacturing a writing ball, the method comprising:

a sphere forming step of forming a sphere including at least a first hard component containing a first metal, a second hard component containing a second metal, and a binding component;

a surface treatment step of performing a surface treatment on the sphere that has been formed; and an etching step of etching the sphere subjected to the surface treatment using a solution that dissolves the second hard component but does not dissolve the first hard component.

9. The method for manufacturing a writing ball according to claim 8, wherein the writing ball that has been manufactured includes a first outer surface from which the first hard component is exposed, the first outer surface being an outermost surface of the sphere, and a recess including, as a bottom surface, a second outer surface from which the second hard component is exposed, the second outer surface being recessed inward from the first outer surface, and a width dimension of the recess of the writing ball that has been manufactured is varied by varying a particle size of particles constituting the second hard component used in the sphere forming step.

10. The method for manufacturing a writing ball according to claim 8, wherein a smooth surface finishing is performed on the sphere in the surface treatment step.

11. The method for manufacturing a writing ball according to claim 8, wherein a mechanical roughening treatment is performed on the sphere in the surface treatment step.

12. The method for manufacturing a writing ball according to claim 8, wherein a distribution state of recesses formed in the etching step is adjusted by adjusting particle sizes of the first hard component and the second hard component in such a manner that a volume ratio of the first hard component and the second hard component is in a range of 3:7 to 7:3.

* * * * *